US006425483B2

(12) United States Patent
Truc et al.

(10) Patent No.: US 6,425,483 B2
(45) Date of Patent: *Jul. 30, 2002

(54) POSITIVE SLEEVING SYSTEM FOR PHOTOGRAPHIC NEGATIVES

(75) Inventors: James A. Truc, Eden Prairie; Douglas B. Peterson, White Bear Lake; James G. Hogenson, Mounds View, all of MN (US)

(73) Assignee: EastmanKodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/181,372

(22) Filed: Oct. 28, 1998

Related U.S. Application Data

(63) Continuation of application No. 08/746,758, filed on Nov. 15, 1996, now abandoned, which is a continuation of application No. 08/305,686, filed on Sep. 13, 1994, now abandoned.

(51) Int. Cl.[7] .............................. B65D 85/00; A47G 1/06
(52) U.S. Cl. ............................ 206/455; 40/704; 40/776
(58) Field of Search ................................ 206/232, 455, 206/459.5, 820; 40/704, 774, 776

(56) References Cited

U.S. PATENT DOCUMENTS

| | | | | |
|---|---|---|---|---|
| 2,188,813 A | | 1/1940 | King | 206/449 |
| 2,197,845 A | * | 4/1940 | Ward | 706/820 |
| 3,309,805 A | * | 3/1967 | Thomas | 40/776 X |
| 4,095,694 A | | 6/1978 | Jost | |
| 4,720,733 A | * | 1/1988 | Ohtake et al. | 40/704 X |
| 4,771,343 A | | 9/1988 | Takenaka | |
| 4,897,944 A | * | 2/1990 | Otake et al. | 40/776 X |
| 4,966,285 A | | 10/1990 | Otake et al. | |
| 4,979,032 A | | 12/1990 | Alessi et al. | 358/76 |
| 5,000,319 A | | 3/1991 | Mermelstein | |
| 5,031,773 A | | 7/1991 | Manico, Jr. et al. | |
| 5,049,984 A | | 9/1991 | Moore, Jr. et al. | |
| 5,092,466 A | | 3/1992 | Anderson | 206/459.5 X |
| 5,157,482 A | | 10/1992 | Cosgrove | |
| 5,179,409 A | | 1/1993 | Kazami et al. | |
| 5,259,504 A | | 11/1993 | Manico | 206/455 |
| 5,400,152 A | | 3/1995 | Manico et al. | |
| 5,423,425 A | | 6/1995 | Stompe | 206/44 B |
| 5,431,449 A | | 7/1995 | Arimoto et al. | 206/455 |
| 5,436,694 A | | 7/1995 | Ishikawa et al. | 206/455 X |

FOREIGN PATENT DOCUMENTS

EP 0 550 932 A1 12/1992

* cited by examiner

Primary Examiner—Bryon P. Gehman
(74) Attorney, Agent, or Firm—Kinney & Lange; David A. Novais

(57) ABSTRACT

A storage medium for storing photographic negatives has a positive image of each stored photographic negative printed on an outer surface. A system for obtaining positive images from photographic negatives and placing the positive images onto the storage medium includes an image sensor for scanning photographic negatives, a processor for electronically processing the scanned negatives and a printer for printing positive images onto the storage medium.

14 Claims, 5 Drawing Sheets

POSITIVE SLEEVING SYSTEM FOR PHOTOGRAPHIC NEGATIVES

This application is a Continuation of U.S. patent application Ser. No. 08/746,758 entitled *Positive Sleeving System for Photographic Film Negatives*, filed on Nov. 15, 1996, now abandoned, which is a Continuation of U.S. patent application Ser. No. 08/305,686 entitled the same, filed on Sep. 13, 1994, now abandoned.

BACKGROUND OF THE INVENTION

The following invention relates to the storage of photographic negatives and, in particular, to a storage medium for storing photographic negatives in which positive images are used to identify the subject matter of the stored photographic negatives.

After a roll of photographic film has been developed and the photographs printed, the photographic negatives are usually cut into short strips and placed into sleeves to protect the negatives from damage. Each sleeve comprises an elongated rectangular pouch which does little more than protect the negatives. The sleeves are then placed in a package containing the printed photographs which is given to the customer for whom the photographs were printed.

A problem with the use of such sleeves is that it is difficult to determine which printed photograph is represented in each negative. When it is desired to make a duplicate of a photograph, many negatives must often be taken out of the sleeves in which they are stored and held up to the light to be scrutinized before it can be determined which negative represents the desired photograph. When handled in such a manner, fingerprints are often deposited on the negatives and the negatives can become scratched or otherwise damaged, resulting in poor quality reprints or enlargements.

In addition, when more than one roll of photographic negatives is stored in one place, such as a box or drawer, the sleeves containing each set of negatives often get separated from the printed photographs to which they correspond. This makes it even more difficult to find the negative that corresponds to a particular photograph.

It would therefore be beneficial to provide a system for storing photographic negatives which not only protects the negatives from damage, but in which each negative can be easily identified. It would be desirable if such a storage system were not significantly more expensive than the currently used sleeves for storing photographic negatives.

SUMMARY OF THE INVENTION

The present invention provides a storage medium for storing photographic negatives, the storage medium having positive images of the stored photographic negatives printed on an outer surface. The present invention also provides a system for obtaining positive images of photographic negatives and printing the positive images on the storage medium.

The storage medium generally comprises a plurality of sleeves, each of which forms a pocket in which the photographic negatives are stored. Each sleeve has a positive image of each photographic negative contained in that sleeve printed on an outer surface of the sleeve in a position corresponding to the location of the photographic negative which it represents. In this way, the subject matter of each stored photographic negative can be determined by reference to the positive images. The storage medium of the present invention is fabricated from one or more sheets of a material such as paper or plastic and the positive images can be printed on each sleeve in either color or black and white.

The system for obtaining positive images of photographic negatives and printing the positive images on the sleeves of the storage medium includes an image sensor onto which is projected the images contained on each photographic negative to be stored. The image sensor scans the projected images and provides electronic data representing each image to a control computer. The control computer electronically processes the data representing each image to obtain a positive image and provides the positive image to a printer. The printer can be a standard color or black and white printer and prints the positive image on the sleeve that is to contain the photographic negative from which the positive image was obtained.

The control computer, in addition to obtaining positive images from each scanned image, electronically processes each scanned image to correct for color variations and to improve image quality. In addition to being provided to a printer, the processed positive images can be provided to a floppy disc drive for storage on a floppy disc.

Each sleeve in the storage medium has a hole therethrough near an open end, enabling the storage medium to be stored in a ring binder with the open end of each sleeve facing a corresponding ring. This keeps the photographic negatives from sliding out of the sleeve in which they are stored while providing a convenient way in which to store and identify negatives from multiple rolls of film.

DETAILED DESCRIPTION OF THE PREFERRED EMBODIMENTS

The present invention provides a storage medium for storing photographic negatives in which the negatives stored can be easily identified and accessed. Identification of the negatives is accomplished by printing on an outer surface of the storage medium positive images of the stored photographic negatives, each of the positive images being printed in a position corresponding to the position of the photographic negative which it represents.

In a system for obtaining positive images of photographic negatives and printing the positive images onto the storage medium, each photographic negative to be stored in the storage medium is projected onto a linear scanner which scans the projected image and produces an electronic representation of the image. The electronic representation of the scanned image is converted into a digital form and is electronically processed to place the electronic representation into a form suitable for printing. The electronically processed representation of the scanned image is then provided to a printer which prints a positive image of the first photographic negative onto an outer surface of the storage medium at a desired location.

Figure 1:
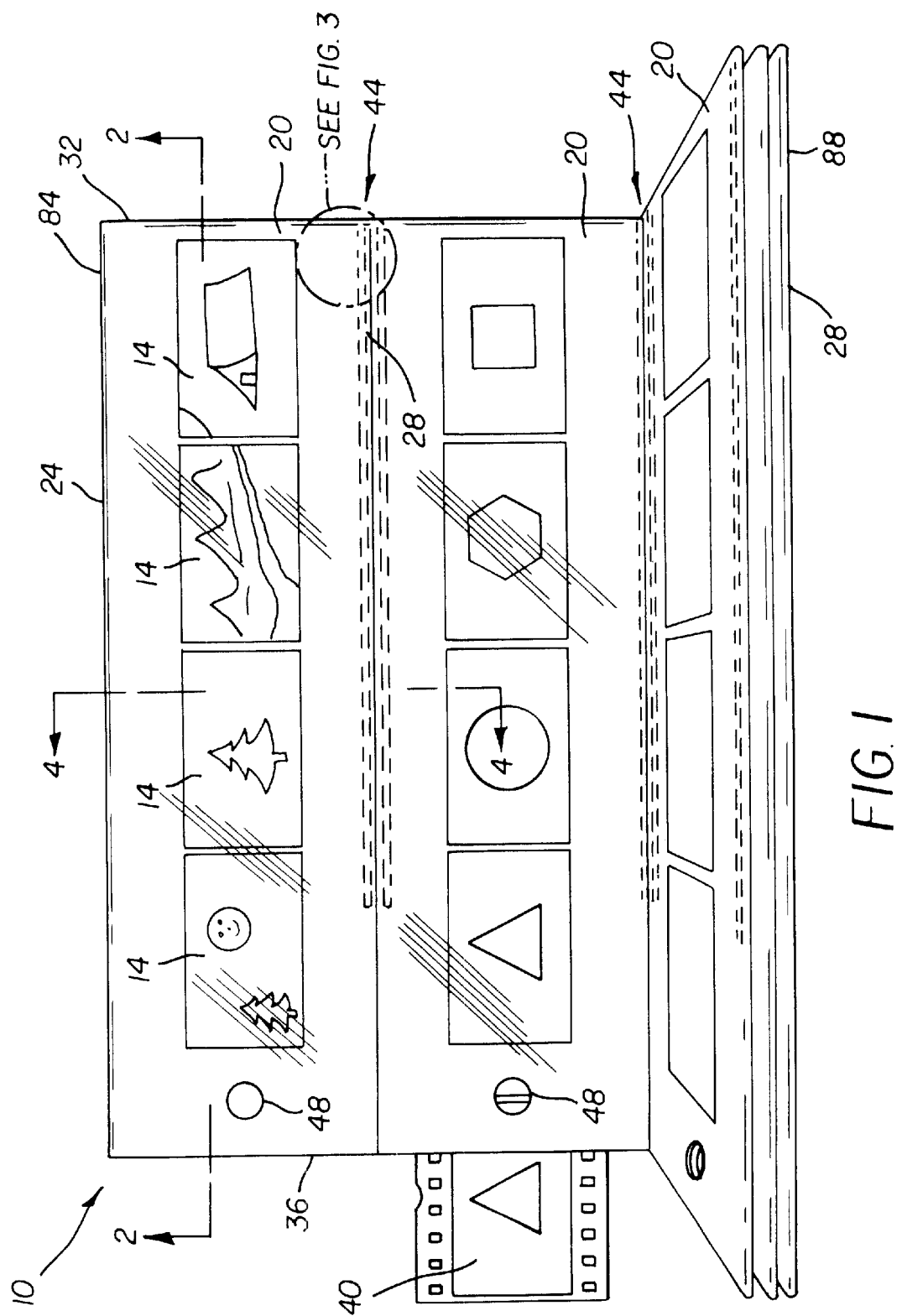
FIG. 1 is a schematic diagram showing a storage medium of the present invention.

A storage medium 10 of the present invention on which is printed a plurality of positive images 14 is shown in FIG. 1. The storage medium 10 includes a plurality of sleeves 20, each of which has a first side 24, a second side 28, a closed first end 32 and an open second end 36. Each sleeve 20 is shown as having four positive images 14 printed thereon and can hold up to four thirty-five millimeter photographic negatives 40. A plurality of generally parallel seams 44 extend between each pair of adjacent sleeves 20 beginning at the first end 32 of the sleeves 20 and ending short of the second end 36 of the sleeves 20. Each sleeve 20 has a hole 48 therethrough near the second end 36.

Figure 2:
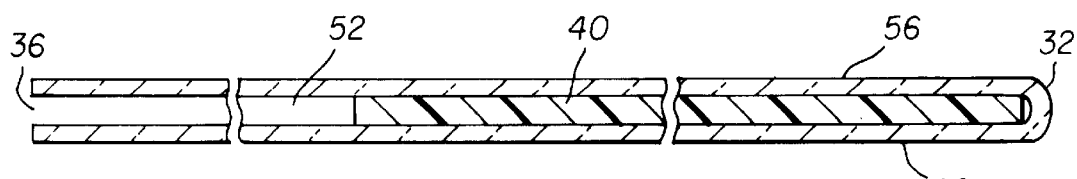
FIG. 2 is a sectional view taken alone the line 2—2 of FIG. 1.

FIG. 2 shows a sectional view of a portion of the storage medium 10. As shown in FIG. 2, each sleeve 20 has a storage space 52 formed between a first surface 56 and a second surface 60 of the sleeve 20 in which can be stored a plurality of photographic negatives 40. The storage space 52 of each sleeve 20 has both a length and a width that are slightly smaller than those of the sleeve 20 in which it is formed.

Figure 3:
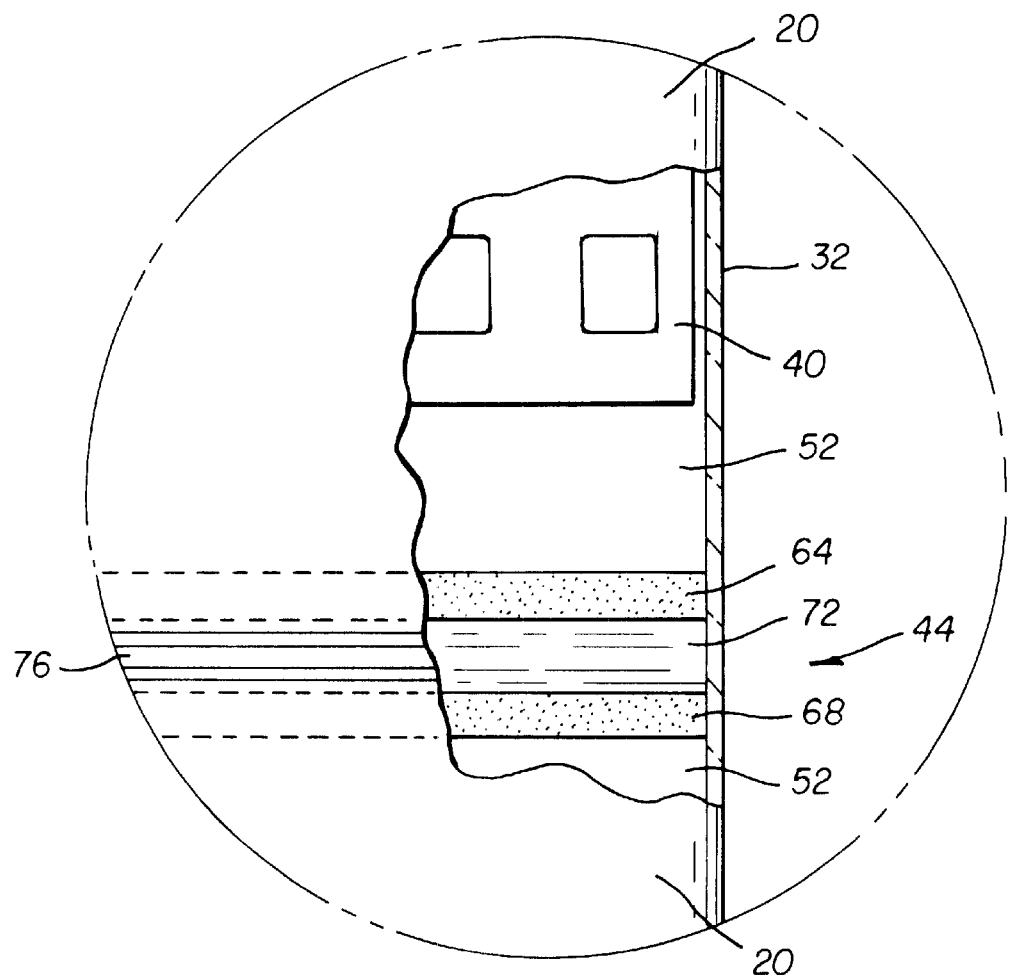
FIG. 3 is an enlarged view of a portion of the storage medium of the present invention.

An enlarged view of a portion of a seam 44 is shown in FIG. 3. As shown in FIG. 3, each seam 44 comprises a first adhesive strip 64, a second adhesive strip 68 and a gap area 72 in which is formed a crease 76. The first and second adhesive strips 64 and 68 extend generally parallel to each other on opposite sides of the gap area 72 and define the side boundaries of the storage spaces 52 of the adjacent sleeves 20. Each seam 44 thus separates the storage spaces 52 of the sleeves 20 adjacent the seam 44, preventing the photographic negatives 40 contained in one storage space 52 from coming into contact with the photographic negatives contained in the adjacent sleeve 20.

The crease 76 enables the storage medium 10 to be more easily folded along the gap area 72, and the storage medium 10 can be folded in an accordion-like fashion as shown in FIG. 1. This enables the storage medium 10 to fit into small spaces, enabling easier transport of the storage medium 10 and the stored photographic negatives 40. The crease 76 can be perforated to allow one or more of the sleeves 20 to be easily separated from the remainder of the storage medium 10. In a preferred embodiment, both the first and second adhesive strips 64 and 68 have a width of approximately 0.05 inches and the gap area 72 has a width of approximately 0.06 inches.

Figure 4:
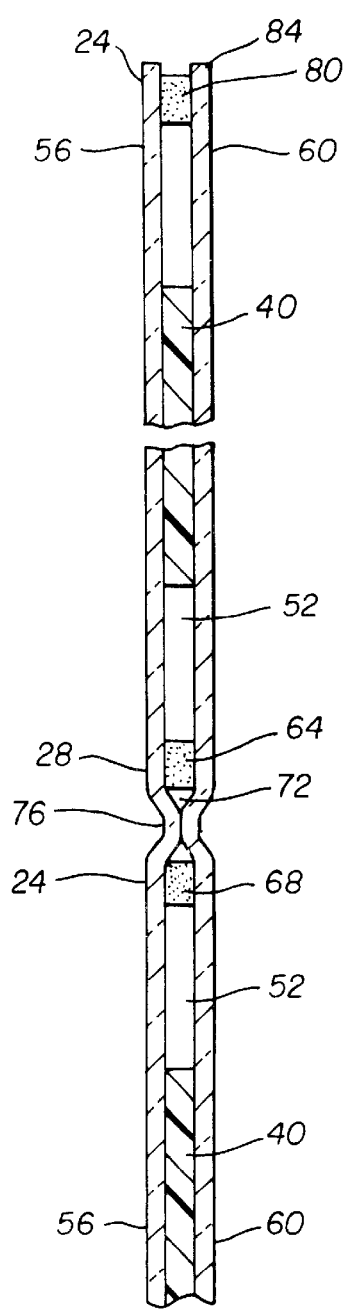
FIG. 4 is a sectional view taken along the line 4—4 of FIG. 1.

A sectional view of a portion of the storage medium 10, including a seam 44, is shown in FIG. 4, which shows the manner in which the seam 44 separates adjacent storage spaces 52. The first side 24 of the sleeve 20 at one end of the storage medium 10 and the second side 28 of the sleeve 20 at the opposite end of the storage medium 10 are sealed closed through the use of an adhesive strip 80. The adhesive strip 80 is similar to the first and second adhesive strips 64 and 68 used to form each seam 44.

The storage medium 10 is generally fabricated from a single sheet of a material such as paper or plastic. The sheet is first folded in half and the line along which the sheet was folded forms the closed first end 32 of each of the sleeves 20. The two edges of the folded sheet which run perpendicular to the closed first ends 32 are each sealed by adhesive strips 80 to form first and second ends 84 and 88 of the storage medium 10. Six seams 44 having the construction described above are then formed in the sheet, dividing the storage medium 10 into seven sleeves 20.

Once the construction of the storage medium 10 is completed, the positive images 14 are printed on the first surface 56 of each sleeve using the system described below. In a preferred embodiment, each sleeve 20 is approximately 6.75 inches in length and 2 inches in width. These dimensions allow a strip of four thirty-five millimeter photographic negatives 40 to be inserted into each sleeve 20 through its open second end 36 as shown in FIG. 1. The material used to fabricate the storage medium 10 is preferably acid free to avoid damaging the photographic negatives 40.

A typical storage medium 10 of the present invention, such as that shown in FIG. 1, can have up to twenty-eight positive images 14 printed thereon, with four positive images 14 positioned along the length of each sleeve 20. Each of the images 14 on a sleeve 20 is a positive image of one of the photographic negatives 40 that is to be contained in the sleeve 20 and is located at a position along the length of the sleeve 20 corresponding to the position along the length of the storage space 52 at which the photographic negative 40 which it represents is to be located. Thus, the subject matter of each of the photographic negatives 40 contained in the storage medium 10 can be determined by reference to the positive images 14 printed on the storage medium 10. If there are fewer than twenty-eight photographic negatives 40 to be stored in the storage medium 10, then there would be a corresponding fewer number of positive images 14 printed on the storage medium 10.

While the storage medium 10 of the present invention has been described as being designed to hold seven strips of four thirty-five millimeter photographic negatives, a storage medium can be designed to hold both longer and shorter strips of negatives as well as to hold other configurations of photographic negatives. In addition, a storage medium can be designed to hold a single photographic negative as well as one or more photographic negatives that are not of a standard thirty-five millimeter size. Further, while the storage medium 10 shown in FIG. 1 comprises seven sleeves 20 for storing photographic negatives, a storage medium can be manufactured to include any number of sleeves 20.

Figure 5:
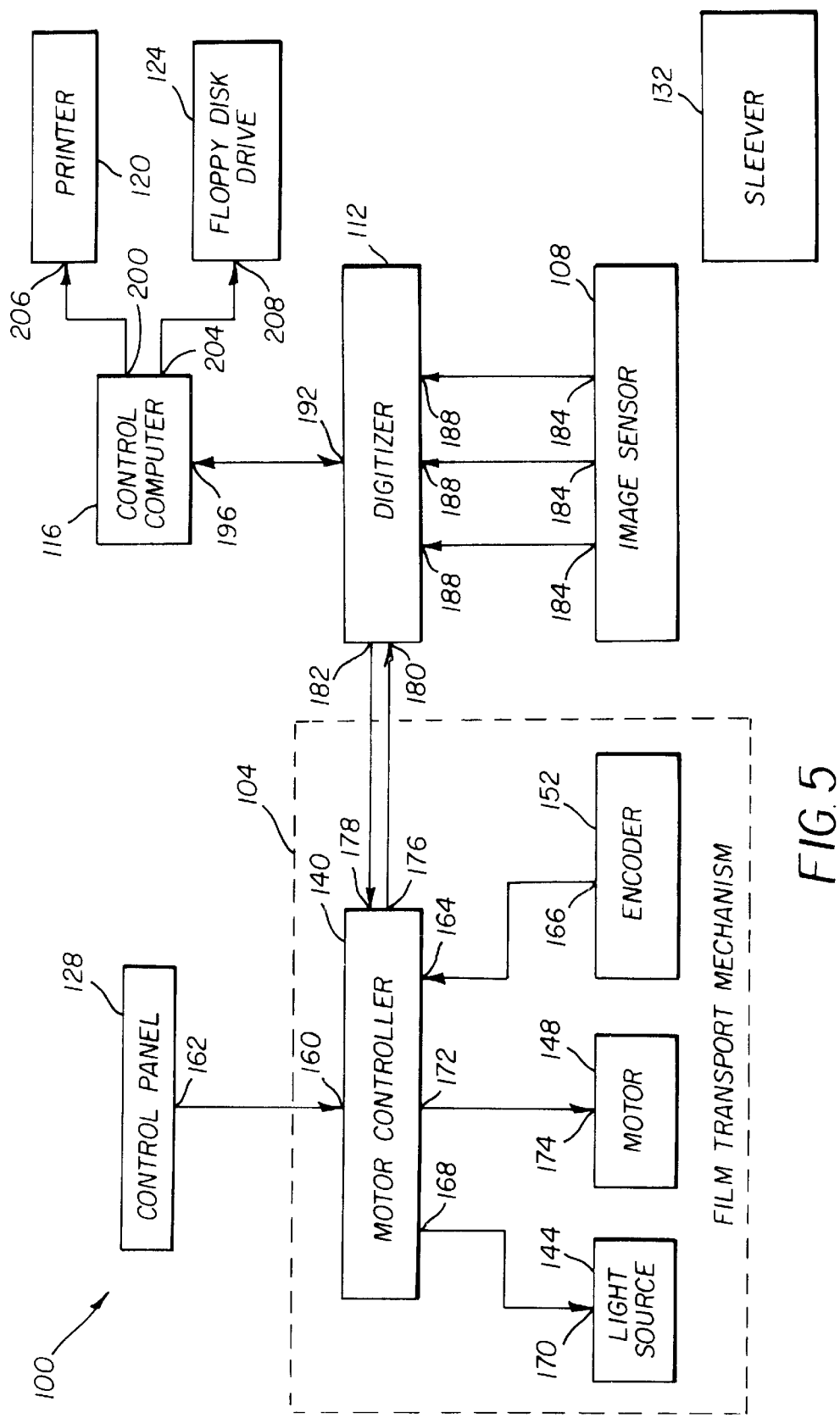
FIG. 5 is a block diagram of a system for obtaining positive images from photographic negatives and printing the positive images on the storage medium of the present invention.

A block diagram of a positive sleeving system 100 for obtaining positive images of photographic negatives and printing the positive images onto a storage medium 10 is shown in FIG. 5. The system 100 comprises a film transport mechanism 104, an image sensor 108, a digitizer 112, a control computer 116, a printer 120, a floppy disc drive 124, a control panel 128 and a sleeving mechanism 132. The film transport mechanism 104 includes a motor controller 140, a light source 144, a drive motor 148 and a quadrature shaft encoder 152.

The motor controller 140 has a first input 160 which is electrically connected to an output 162 of the control panel 128 and a second input 164 which is electrically connected to an output 166 of the quadrature shaft encoder 152. The motor controller 140 has a first output 168 which is electrically connected to an input 170 of the light source 144 and a second output 172 which is electrically connected to an input 174 of the drive motor 148. A third output 176 and a third input 178 of the motor controller 140 -are electrically connected to a first input 180 and a first output 182 of the digitizer 112 respectively.

The image sensor 108 has three outputs 184, each of which is electrically connected to one of three second inputs 188 of the digitizer 112. The digitizer 112 has a two-way communications port 192 which is linked with a two-way communications port 196 of the control computer 116 such that the. control computer 116 can both provide instructions to the digitizer 112 and receive information from the digitizer 112. The control computer 116 has a first output 200 and a second output 204 which are electrically connected to an input 206 of the printer 120 and an input 208 of the floppy disc drive 124 respectively.

Figure 6:
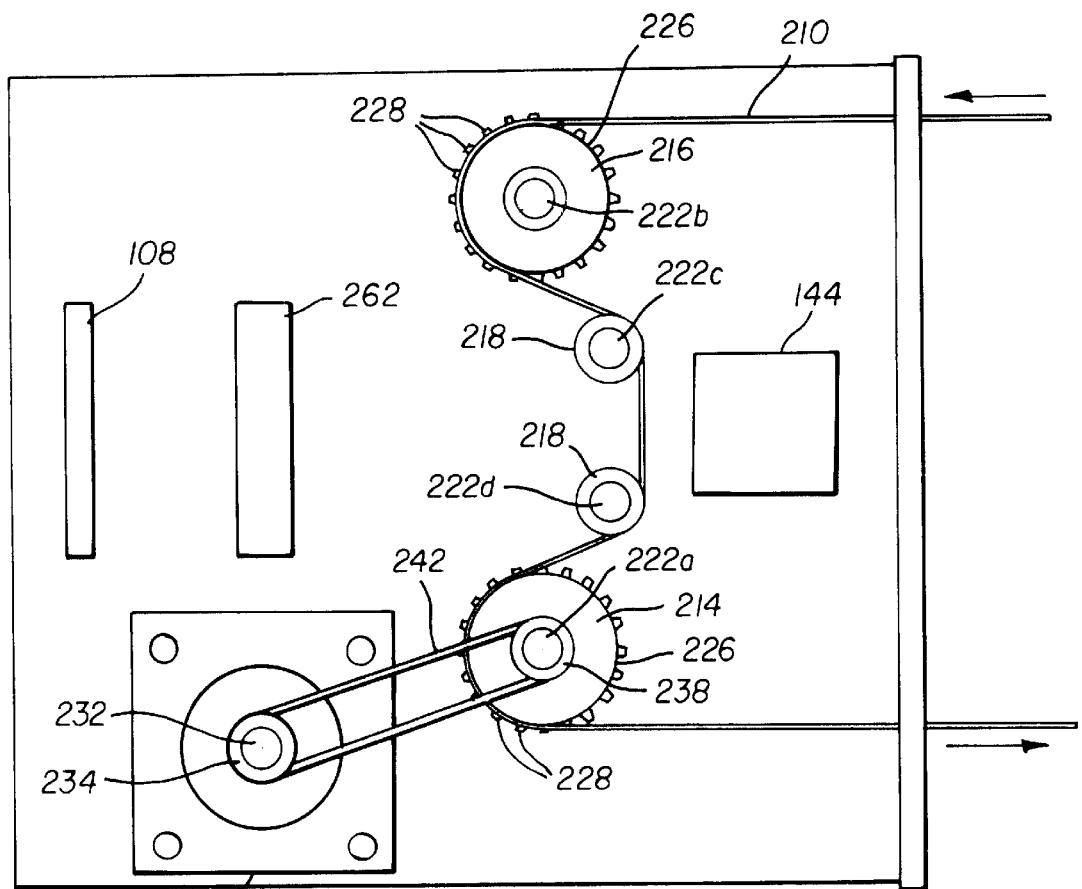
FIG. 6 is a schematic diagram showing a portion of the system for obtaining and printing positive images, including a film advancing mechanism.

The film transport mechanism 104, which is shown in more detail in FIG. 6, is used to advance a roll of photographic negatives or film 210 past the light source 144 so that each photographic negative is projected onto the image sensor 108. The film transport mechanism 104 includes a first roller 214, a second roller 216 and a pair of guide rollers 218, which are mounted on and can rotate about shafts 222a, 222b, 222c and 222d respectively. Both the first roller 214 and the second roller 216 have a sprocket wheel 226 at one end, the sprocket wheel 226 having a plurality of sprockets 228 for engaging the holes that are located along the edge of an ordinary roll of film 210.

The drive motor 148 is a variable speed DC motor which can be operated to rotate a drive shaft 232 on which is located a drive pulley 234. The drive pulley 234 is linked with a first pulley 238, which is rigidly attached to the first roller 214, by a belt 242 such that the first pulley 238 and the first roller 214 are rotated when the drive motor 148 is operated to rotate the drive shaft 232. When the first roller 214 is rotated, the sprocket wheel 226 attached at its end is also rotated and the film 210 is advanced through the film transport mechanism 104. The guide rollers 218 are used to help keep the roll of film 210 under tension and flat as it passes by the light source 144. The film 210 has a tendency to curl at its edges if not kept flat, making it more difficult to focus the image from each photographic negative onto the image sensor 108.

The electrical connections between the motor controller 140 and the digitizer 112, along with the electrical connections between the digitizer 112 and the control computer 116, enable two way communication between the motor controller 140 and the control computer 116. The motor controller 140 can thus receive instructions from the control computer 116 and provide information regarding the drive motor 148 to the control computer 116.

The motor controller 140, under the direction of the control computer 116, instructs the drive motor 148 to move the film 210 past the light source 144 at a desired, precisely controlled speed. The speed at which the drive motor 148 is operated is set by the control computer 116 based on operator instructions received from the control panel 128. The speed and position of the drive shaft 232 is monitored by the motor controller 140 through the use of the quadrature shaft encoder 152, which provides an electrical signal to the motor controller 140 indicating the speed and direction of rotation of the drive shaft 232. The shaft encoder 152, the drive motor 148 and the motor controller 140 thus form a servo mechanism.

The speed at which the film 210 is moved through the film transport mechanism 104 can be varied with respect to the speed at which the drive motor 148 rotates the drive shaft 232 through the use of a system of gears, belts and pulleys. The motor controller 140, in addition to controlling the operation of the drive motor 148, controls the operation of the light source 144, which includes a diffuser to ensure ,that the light strikes each photographic negative evenly.

Figure 7:
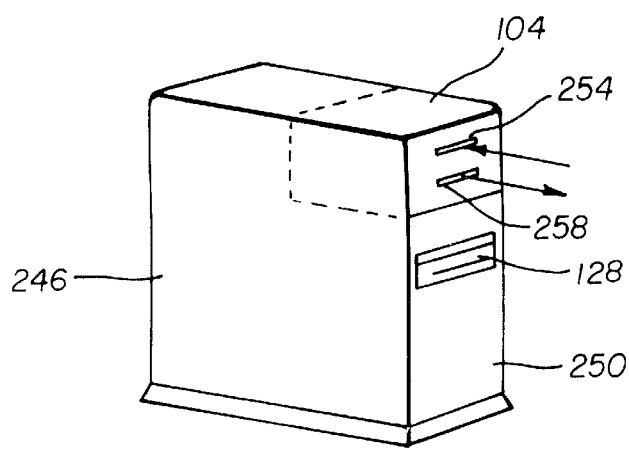
FIG. 7 is a perspective view of a housing in which the system for obtaining and printing positive images is located.

The entire positive sleeving system 100, with the exception of the sleeving mechanism 132 and the printer 120, is contained in a housing 246 which is shown in FIG. 7. The film transport mechanism 104 is located adjacent to a front panel 250 of the housing 246. Each roll of film 210 to be processed enters the film transport mechanism 104 through a first opening 254 of the front panel 250 and exits the film transport mechanism 104 through a second opening 258 in the front panel 250. In addition, the control panel 128 is located on the front panel 250 of the housing 246.

Referring to FIG. 6, as each frame in the roll of film 210 is moved past the light source 144, the negative image on the frame is projected through a lens system 262 onto the image sensor 108. The lens system 262 comprises a system of lenses and filters and is used to both reduce the size of and focus the image projected onto the image sensor 108.

The resolution of the image provided to the printer 120 must match the resolution at which the image is to be printed. Therefore, it is often necessary to lower the resolution of the image prior to its provision to the printer 120. This can be accomplished by a physical reduction in the size of the projected image through the use of the lens system 262. In addition, the image resolution can be lowered electronically through the use of the control computer 116 during image processing as described below. However, by lowering the image resolution physically using the lens system 262 rather than through computer-based image processing, a substantial increase in the overall time it would take to process the image is avoided.

The lens system 262 lowers the resolution of the projected image by physically reducing the size of the image that is projected onto the image sensor 108, thus reducing the number of pixels that can be scanned by the image sensor 108. The lens system 262 is adjustable to enable a wide range of image size reductions and is capable of reducing the size of the projected image by up to eighty percent. This results in a range of possible scan resolutions by the image sensor 108 between approximately 2000 dots per inch, the maximum scanning resolution of the image sensor 108, and 400 dots per inch. The image sensor 108 used in the current embodiment has a width of twenty-nine millimeters while the film 210 containing the negative images to be projected generally has a width of thirty-five millimeters. Therefore, each image projected onto the image sensor 108 must be at least slightly reduced by the optical array 262 to enable the image sensor 108 to scan the entire image.

The image sensor 108 is a linear color scanner which scans each projected image received from the lens system 262 one line at a time and converts the image to an electronic form. The image sensor 108 simultaneously produces analog electronic data relating to each scanned image on three channels, one each for the red, green and blue components of the image. Together, the electronic data produced on the three channels comprises an electronic representation of the scanned image. Each channel of analog electronic data is provided at one of the outputs 184 of the image sensor 108 for provision to a corresponding one of the second inputs 188 of the digitizer 112. If desired, the image sensor 108 can provide an electronic representation of the projected image having a resolution lower than that of the projected image by sampling only selected pixels of the projected image. The image sensor 108 used in the positive sleeving system 100 can be any of a variety of commercially available linear color scanners such as the KLI-2103 manufactured by Kodak®.

The digitizer 112 is located on a standard sixteen bit Industry Standard Architecture circuit board which is electrically connected to the control computer 116. The digitizer 112 includes three analog to digital converters, each of which receives analog electronic data relating to each scanned image from one of the second inputs 188 of the digitizer 112. Each analog to digital converter has an eight bit resolution and a two hundred nanosecond conversion time and converts the received analog electronic, data to a digital form which can be processed by the control computer 116. After conversion of the electronic representation of the scanned image to a digital form, each pixel of the scanned image is represented by three eight-bit values corresponding to the intensity of the red, green and blue components of the pixei. Each of these values is transmitted from the digitizer 112 to the control computer 116.

The digitizer 112 further includes two one-byte first-in first-out data buffers for each analog to digital converter. Each of the buffers is capable of buffering the digital electronic data relating to the scanned image and the buffers are used to resolve any timing differences in the analog electronic data received from the image sensor 108 prior to the provision of the digital electronic data to the control computer 116.

The control computer 116 is a standard IBM®PC/AT compatible computer utilizing a 486DX microprocessor manufactured by Intel® and having sixteen megabytes of random access memory. The control computer 116 controls the operation of the motor controller 140 and the digitizer 112 through the use of software operating on the 486DX microprocessor. In addition, the control computer 116 electronically processes the digital electronic data provided by the digitizer 112 for each scanned image and provides the processed data to both the printer 120 and the floppy disc drive 124. The electronic processing of the digital electronic data is accomplished through the use of software which is run on the 486DX microprocessor.

The digital electronic data representing each scanned image is provided to the random access memory of the control computer 116 from the digitizer 112 in sixteen bit words using direct memory access. The digital electronic data is provided to the control computer 116 in a manner such that each sixteen bit word contains data representing only a single color component of the scanned image. Each set of received data remains in the memory of the control computer 116 for a period of time long enough for the control computer 116 to electronically process the digital electronic data relating to the scanned images in the set and to provide the processed data to the printer 120.

The electronic processing performed by the control computer 116 includes processing the digital electronic data representing each scanned image to convert it from a representation of a negative image to a representation of a positive image. The electronic processing also includes correcting color variations in the scanned image and rotating the image ninety degrees. Color correction is used in part to remove the overall brown tint of the film 210 while rotation of the scanned image is used to orient the image in a desired direction for printing onto a storage medium 10. Electronic processing can also be performed by the control computer 116 to improve the quality of the scanned image through resizing, filtering and sharpening of the image. Each of the described electronic processing functions can be accomplished through the use of electronic circuit components as well as through the use of software operating on the microprocessor of the control computer 116.

Two sets of digital electronic data representing each scanned image are stored in the memory of the control computer 116 at one time. The first set is unprocessed digital electronic data as provided from the digitizer 112 and the second set is data to be sent to the printer 120. The unprocessed digital electronic data provided from the digitizer 112 is stored in the memory of the control computer 116 until the second set is processed and provided to the printer 120, at which time the next set of digital electronic data from the digitizer 112 is stored in the random access memory of the control computer 116. The scanned images are both electronically processed and printed in groups of four so that each set of digital electronic data represents four scanned images. Thus, the control computer 116 must have sufficient memory to store at least eight scanned images.

As described above, each pixel of a scanned image is represented by three eight-bit values. Therefore, storage of a single pixel requires three bytes of memory. For an image resolution of 300 dots per inch, a scanned image from frame of thirty-five millimeter film will comprise 300×450 dots and each scanned image will require slightly more than 400 kilobytes of memory. To store the digital data representing eight images at this resolution will therefore require approximately 3.2 megabytes of memory. For an image resolution of 1000 dots per inch, each scanned image from a frame of thirty-five millimeter film will require approximately 4.5 megabytes of memory and eight images will require thirty-six megabytes of memory.

The printer 120 is preferably a Desk Jet 1200C manufactured by Hewlett Packard®. However, any standard color printer having a minimum printing resolution of 300 dots per inch can be used. The printer 120 contains electronic circuitry which is used to convert each pixel from representation in terms of its red, green and blue components to representation in terms of the printing colors of cyan, magenta and yellow.

The printer 120 receives a set of digital electronic data representing a set of four positive images from the control computer 116 and prints four positive images 14 at one time onto the first surface 56 of a first one of the sleeves 20 of a storage medium 10. Once the four positive images 14 have been printed, the printer 120 receives the next set of digital data representing the next set of four positive images and prints four positive images 14 onto the first surface 56 of a second one of the sleeves 20. This process continues until each of the scanned images from a roll of film 210 has been processed and printed onto the storage medium 10. In some instances, there are more than twenty-eight photographic negatives in a roll of film 210. When this is the case, the printer 120 will print 28 positive images 14 on the storage medium 10 and will then print the remaining positive images obtained from the photographic negatives on the roll on a second storage medium 10.

The printer 120 can be configured to print the date, the name of the developing lab and other useful information on each storage medium 10, in addition to printing the positive images 14. Further, in addition to being provided to the printer 120, the processed digital electronic data representing each scanned image can be provided to the floppy disc drive 124 for storage on a floppy disc.

After an entire roll of film 210 has been advanced through the film transport mechanism 104, it is manually cut into strips, each of which contains four photographic negatives. Once the scanned images from the roll of film 210 are printed onto a storage medium 10, the sleeving mechanism 132 is used to help a user of the positive sleeving system 100 place each of the strips into the sleeve 20 of the storages medium 10 on which is printed the corresponding positive images.

Although the positive sleeving system 100 has been described as capable of processing and printing the images contained on color film, it can also be used to process and print the images contained on black and white film. Black and white photographic negatives can be scanned using either a black and white image sensor or a color image sensor in a manner similar to that described for color negatives. When a color image sensor is used, the analog electronic data representing the scanned image is produced on only one of the three channels and is provided to the digitizer 112 where it is converted to a digital form using only one of the analog to digital converters. The digital electronic data is electronically processed by software operating in the central processing unit of the control computer 116 and is provided to a printer capable of printing black and white images.

Large numbers of storage media 10 can be stored in a storage system utilizing a special seven ring binder. Each of the rings in the binder are equally spaced from each other at a distance roughly equal to the width of one sleeve 20 of the storage medium 10. The binder is designed so that each of the rings can pass through the hole 48 in each sleeve 20, thereby holding the storage medium 10 in place. In addition, the hole 48 in each sleeve 20 is placed sufficiently close to the open second end 36 of the sleeve 20 such that the photographic negatives 40 stored in each sleeve 20 are kept from sliding out of the sleeve 20.

While described as being fabricated from paper, the storage medium 10 of the present invention can also be fabricated from a variety of, other materials including polymer-based materials. In addition, while described as being formed from a single sheet of material, the storage medium 10 can be formed from more than one sheet of material.

Although described as being located on a standard sixteen bit Industry Standard Architecture circuit board, the digitizer 112 can be located on a board designed to Extended Industry Standard Architecture (EISA) standards to increase the rate at which the analog electronic data provided to the digitizer 112 can be converted to a digital form and provided to the control computer 116. The use of an EISA circuit board would also enable the digitizer 112 to process higher resolution images. The image sensor 108, while described as scanning each projected image one line at a time, can be made to scan an entire image at once.

It is possible for each pixel of the scanned image to be represented by three values having a resolution greater than eight bits. However, this would greatly increase the amount of memory required to store the electronic representation of each projected image. Additional random access memory can be added to the control computer 116 if it is desired to process such higher resolution scanned images.

The storage medium 10 of the present invention provides a way in which to store and easily identify photographic negatives. By fabricating the storage medium 10 from an inexpensive material such as ordinary paper, the cost of fabricating the storage medium 10 is minimized. In addition, the use of a material such as paper makes the printing of positive images directly on the storage medium both relatively simple and inexpensive. The subject matter of each stored photographic negative can be quickly and easily identified by reference to the sleeve in which it is stored without the need to create any separate materials for identification.

Although the present invention has been described with reference to preferred embodiments, workers skilled in the art will recognize that changes may be made in form and detail without departing from the spirit and scope of the invention.

What is claimed is:

1. In combination, a photographic film negative and a storage medium for storing and identifying the photographic film negative, the storage medium comprising:

a plurality of generally parallel elongated sleeves, each sleeve having a first outer surface and a storage space with a length sufficient to hold a multiframe photographic film negative, wherein a positive image of the photographic film negative is ink-jet printed on the first outer surface in a first location directly above a second location in which the photographic film negative is stored, such that each positive image on said sleeve is located at a position along a length of the sleeve that corresponds to a position along the length of the storage space at which the photographic film negative which it represents is located; and a longitudinal perforated fold line separating each sleeve from an adjacent sleeve allowing for folding the storage medium and allowing a sleeve to be separated from an adjacent sleeve while still enabling identification of the stored photographic film negative.

2. The combination of claim 1 wherein the storage medium is fabricated from a single sheet of material.

3. The combination of claim 1 wherein the sleeve of the storage medium has an open first end through which a photographic negative can be inserted into the sleeve.

4. The combination of claim 1, wherein an end of each sleeve has a hole therethrough to enable storage in a binder.

5. In combination, a plurality of photographic film negatives and a storage medium for storing and identifying said plurality of photographic negatives, the storage medium comprising:

a receptacle capable of receiving and holding the plurality of photographic negatives, each photographic negative comprising an elongated strip having multiple frames held at a first distinct location; and a positive image of each photographic negative ink-jet printed directly upon the receptacle in a second distinct location directly above the first distinct location, wherein the receptacle has longitudinal perforated defining individual sleeves seams to allow the receptacle to be folded and separated at the perforated seams while still enabling identification of the stored photographic negative stripe after such separation; wherein the storage medium receptacle includes said sleeves each having a first outer surface, and the positive image of each photographic negative and a said strip is located on the first outer surface of one and said sleeve in a one-to-one correspondence with the photographic negative and said strip which the positive image represents.

6. The combination of claim 5 wherein each sleeve of the storage medium has the general shape of a rectangle which forms a storage space between the first outer surface arid a second surface.

7. The combination of claim 6 wherein the sleeve of the storage medium has an open first end through which the photographic negative can be inserted into the storage space.

8. The combination of claim 5 wherein the storage medium receptacle is fabricated from paper which avoids damaging the photographic film negatives.

9. The combination of claim 5 wherein the storage medium receptacle is fabricated from an opaque plastic.

10. The combination of claim 5, wherein an end of the sleeve has a hole therethrough.

11. In combination:

a plurality of strips of photographic film negatives; and a storage medium for storing said photographic film negatives and identifying the stored photographic film negatives at a glance, the storage medium comprising:

a plurality of generally parallel elongated sleeves, each sleeve having a sleeve length sufficient to hold a multiframe photographic film strip and containing one of the plurality of photographic negative strips, wherein the sleeves are separated by a longitudinal perforated fold line; and positive images of each strip of the photographic film negative obtained from electronic scan data ink jet printed on an outer surface of one of the plurality of perforated sleeves so that the positive images on the sleeve are located directly in front of the photographic film negative strip on which the positive images are based, wherein the longitudinal perforated fold line allows the storage medium to be folded and allows a said sleeve to be separated from an adjacent said sleeve while still enabling the stored photographic film negative to be identified at a glance.

12. The combination of claim 11 wherein each sleeve of the storage medium has the general shape of a rectangle and forms a storage space between the first outer surface and a second outer surface.

13. The combination of claim 11 wherein each sleeve of the storage medium has a first end through which a photographic film negative can be inserted into the storage medium.

14. The combination of claim 11, wherein an end of each sleeve has a hole therethrough to enable storage in a binder.

\* \* \* \* \*

UNITED STATES PATENT AND TRADEMARK OFFICE
CERTIFICATE OF CORRECTION

PATENT NO.     : 6,425,483 B2                                              Page 1 of 1
DATED          : July 30, 2002
INVENTOR(S)    : James A. Truc et al.

It is certified that error appears in the above-identified patent and that said Letters Patent is hereby corrected as shown below:

Column 10,
Line 46, "stripe" should read -- strip --
Lines 49, 50 and 52, "and" should read -- of --

Signed and Sealed this

Eighteenth Day of November, 2003

JAMES E. ROGAN
*Director of the United States Patent and Trademark Office*